US008685478B2

(12) United States Patent
Neidle et al.

(10) Patent No.: US 8,685,478 B2
(45) Date of Patent: Apr. 1, 2014

(54) FLAVOR POUCH

(75) Inventors: Bruce Neidle, Midlothian, VA (US); Kenneth Newman, Prince George, VA (US); William R. Sweeney, Richmond, VA (US); Cynthia S. Hayes, Midlothian, VA (US); Robert T. Mitten, Glen Allen, VA (US); Danielle R. Crawford, Chester, VA (US)

(73) Assignee: Philip Morris USA Inc., Richmond, VA (US)

( * ) Notice: Subject to any disclaimer, the term of this patent is extended or adjusted under 35 U.S.C. 154(b) by 1168 days.

(21) Appl. No.: 11/601,622

(22) Filed: Nov. 20, 2006

(65) Prior Publication Data

US 2007/0207239 A1 Sep. 6, 2007

Related U.S. Application Data

(60) Provisional application No. 60/738,034, filed on Nov. 21, 2005.

(51) Int. Cl.
*B65B 29/02* (2006.01)

(52) U.S. Cl.
USPC ............... 426/78; 426/77; 131/347; 131/352; 131/359

(58) Field of Classification Search
USPC .............. 426/77–84; 131/111, 112, 116, 117, 131/118, 347, 352–359
See application file for complete search history.

(56) References Cited

U.S. PATENT DOCUMENTS

| 307,537 A | 11/1884 | Foulks |
|---|---|---|
| 1,234,279 A | 7/1917 | Buchanan |
| 1,376,586 A | 5/1921 | Schwartz |
| 1,992,152 A | 2/1935 | Yeates |
| 2,306,400 A | 12/1942 | Menzel |
| 2,313,696 A * | 3/1943 | Yates .............................. 426/77 |
| 2,318,101 A | 5/1943 | Rose |
| 2,330,361 A | 9/1943 | Howard |
| 2,528,778 A | 11/1950 | Piazze |
| 3,067,068 A | 12/1962 | Finberg |

(Continued)

FOREIGN PATENT DOCUMENTS

| EP | 0 145 499 | * 6/1985 | ........... B65D 85/808 |
|---|---|---|---|
| EP | 0212234 A2 | 7/1986 | |

(Continued)

OTHER PUBLICATIONS

International Search Report and Written Opinion dated Aug. 6, 2007 for PCT/IB2006/004077.

(Continued)

*Primary Examiner* — Rena Dye
*Assistant Examiner* — Chaim Smith
(74) *Attorney, Agent, or Firm* — Buchanan Ingersoll & Rooney PC

(57) ABSTRACT

A flavor pouch includes a porous covering that encloses a carrier having a flavorant. The carrier may be solid or particulate. Flavorants may be one or more of tea, coffee, rose hips, honey, royal jelly, fruit extracts, mint, sweeteners, ginger, pepper extract, exotic flavors, ethnic flavors and the like. Where the carrier comprises a plurality of beads, the beads may have randomly dissolvable encapsulation to extend the time duration of flavor release. To use the flavor pouch, it is placed in the mouth and masticated or exposed to saliva to thereby release the flavorant.

18 Claims, 2 Drawing Sheets

40  46

(56) References Cited

U.S. PATENT DOCUMENTS

| | | | |
|---|---|---|---|
| 3,162,199 A | 12/1964 | Moll, Jr. | |
| 3,174,889 A | 3/1965 | Anderson et al. | |
| 3,188,265 A | 6/1965 | Charbonneau et al. | |
| 3,369,551 A | 2/1968 | Carroll | |
| 3,415,286 A | 12/1968 | Arnold et al. | |
| 3,600,807 A | 8/1971 | Sipos | |
| 3,607,299 A * | 9/1971 | Bolt | 426/77 |
| 3,692,536 A * | 9/1972 | Fant | 426/79 |
| 3,757,798 A * | 9/1973 | Lambert | 131/270 |
| 3,846,569 A * | 11/1974 | Kaplan | 426/394 |
| 3,932,192 A | 1/1976 | Nakashio et al. | |
| 4,218,286 A | 8/1980 | Jones et al. | |
| 4,347,857 A | 9/1982 | Boden | |
| 4,386,106 A | 5/1983 | Merritt et al. | |
| 4,515,769 A * | 5/1985 | Merritt et al. | 424/49 |
| 4,545,392 A | 10/1985 | Sensabaugh et al. | |
| 4,565,702 A | 1/1986 | Morley et al. | |
| 4,607,479 A | 8/1986 | Linden | |
| 4,624,269 A | 11/1986 | Story et al. | |
| 4,660,577 A | 4/1987 | Sensabaugh et al. | |
| 4,703,765 A * | 11/1987 | Paules et al. | 131/112 |
| 4,797,287 A | 1/1989 | Pich et al. | |
| 4,880,697 A | 11/1989 | Caldwell et al. | |
| 4,892,483 A | 1/1990 | Douglas, Jr. | |
| 4,893,639 A | 1/1990 | White | |
| 4,906,488 A | 3/1990 | Pera | |
| 4,907,605 A | 3/1990 | Ray et al. | |
| 4,917,161 A | 4/1990 | Townend | |
| 4,971,797 A | 11/1990 | Cherukuri et al. | |
| 4,981,522 A | 1/1991 | Nichols et al. | |
| 5,127,208 A | 7/1992 | Custer et al. | |
| 5,144,964 A | 9/1992 | Demain | |
| 5,167,244 A | 12/1992 | Kjerstad | |
| 5,174,088 A | 12/1992 | Focke et al. | |
| 5,186,185 A | 2/1993 | Mashiko et al. | |
| 5,211,985 A | 5/1993 | Shirley, Jr. et al. | |
| 5,240,016 A | 8/1993 | Nichols et al. | |
| 5,263,999 A | 11/1993 | Baldwin et al. | |
| 5,346,734 A | 9/1994 | Wydick, Jr. | |
| 5,372,149 A | 12/1994 | Roth et al. | |
| 5,387,416 A | 2/1995 | White et al. | |
| 5,479,949 A | 1/1996 | Battard et al. | |
| 5,525,351 A | 6/1996 | Dam | |
| 5,549,906 A | 8/1996 | Santus | |
| 5,601,716 A * | 2/1997 | Heinrich et al. | 210/490 |
| 5,726,161 A | 3/1998 | Whistler | |
| 5,733,559 A | 3/1998 | Citernesi | |
| 5,773,062 A | 6/1998 | Cirigliano et al. | |
| 5,780,055 A | 7/1998 | Habib et al. | |
| 5,806,408 A | 9/1998 | DeBacker et al. | |
| 5,829,453 A | 11/1998 | White et al. | |
| 5,921,955 A | 7/1999 | Mazer et al. | |
| 5,927,052 A | 7/1999 | Nippes et al. | |
| 5,997,691 A | 12/1999 | Gautam et al. | |
| 6,046,177 A | 4/2000 | Stella et al. | |
| 6,048,736 A | 4/2000 | Kosak | |
| 6,135,120 A | 10/2000 | Löfman et al. | |
| 6,143,316 A | 11/2000 | Hayden et al. | |
| 6,146,655 A | 11/2000 | Ruben | |
| 6,162,516 A | 12/2000 | Derr | |
| 6,280,761 B1 | 8/2001 | Santus | |
| 6,287,603 B1 | 9/2001 | Prasad et al. | |
| 6,287,612 B1 | 9/2001 | Mandava et al. | |
| 6,325,859 B1 | 12/2001 | De Roos et al. | |
| 6,383,475 B1 | 5/2002 | Meyers et al. | |
| 6,414,033 B1 | 7/2002 | Sceusa | |
| 6,444,253 B1 | 9/2002 | Conklin et al. | |
| 6,455,068 B1 | 9/2002 | Licari | |
| 6,557,561 B1 | 5/2003 | Miyauchi et al. | |
| 6,565,710 B2 | 5/2003 | Salow et al. | |
| 6,706,120 B2 | 3/2004 | Miyauchi et al. | |
| D489,606 S | 5/2004 | Lofman | |
| 6,793,949 B2 | 9/2004 | Panesar | |
| 6,871,473 B1 | 3/2005 | Dutt et al. | |
| 6,878,695 B2 | 4/2005 | Woo et al. | |
| 6,884,885 B2 | 4/2005 | Qi | |
| 6,895,974 B2 | 5/2005 | Peele | |
| 6,942,848 B2 | 9/2005 | Nelson et al. | |
| 6,958,429 B2 | 10/2005 | Bruhn et al. | |
| 6,982,093 B2 | 1/2006 | Licari | |
| 6,984,376 B2 | 1/2006 | Stephenson et al. | |
| 7,030,092 B1 | 4/2006 | Levine | |
| 7,032,601 B2 | 4/2006 | Atchley et al. | |
| 7,090,858 B2 | 8/2006 | Jayaraman | |
| 7,115,586 B2 | 10/2006 | Loftsson | |
| 7,166,671 B2 | 1/2007 | Wood et al. | |
| D568,576 S | 5/2008 | Neidle et al. | |
| D585,626 S | 2/2009 | Chappell, Sr. et al. | |
| 7,584,843 B2 | 9/2009 | Kutsch et al. | |
| 2002/0012689 A1 | 1/2002 | Stillman | |
| 2002/0170567 A1 | 11/2002 | Rizzotto et al. | |
| 2003/0070687 A1 * | 4/2003 | Atchley et al. | 131/352 |
| 2003/0109492 A1 | 6/2003 | Loftsson | |
| 2003/0224090 A1 | 12/2003 | Pearce et al. | |
| 2004/0015756 A1 | 1/2004 | Chiu | |
| 2004/0018293 A1 | 1/2004 | Popplewell et al. | |
| 2004/0037879 A1 | 2/2004 | Adusumilli et al. | |
| 2004/0118421 A1 | 6/2004 | Hodin et al. | |
| 2004/0123873 A1 | 7/2004 | Calandro et al. | |
| 2004/0129280 A1 | 7/2004 | Woodson et al. | |
| 2004/0145261 A1 | 7/2004 | Ganter et al. | |
| 2004/0191322 A1 | 9/2004 | Hansson | |
| 2004/0191366 A1 | 9/2004 | Mangos et al. | |
| 2004/0202698 A1 | 10/2004 | Ramji et al. | |
| 2004/0234479 A1 | 11/2004 | Schleifenbaum et al. | |
| 2004/0247649 A1 | 12/2004 | Pearce et al. | |
| 2004/0247744 A1 | 12/2004 | Pearce et al. | |
| 2004/0247746 A1 | 12/2004 | Pearce et al. | |
| 2005/0000531 A1 | 1/2005 | Shi | |
| 2005/0003048 A1 | 1/2005 | Pearce et al. | |
| 2005/0034738 A1 | 2/2005 | Whalen | |
| 2005/0061339 A1 | 3/2005 | Hansson et al. | |
| 2005/0081264 A1 | 4/2005 | Brugliera et al. | |
| 2005/0100640 A1 | 5/2005 | Pearce | |
| 2005/0172976 A1 | 8/2005 | Newman et al. | |
| 2005/0178398 A1 | 8/2005 | Breslin et al. | |
| 2005/0210615 A1 | 9/2005 | Shastry et al. | |
| 2005/0241656 A1 | 11/2005 | Kennison | |
| 2005/0244521 A1 | 11/2005 | Strickland et al. | |
| 2005/0287249 A1 | 12/2005 | Shukla et al. | |
| 2006/0039973 A1 | 2/2006 | Aldritt et al. | |
| 2006/0073190 A1 | 4/2006 | Carroll et al. | |
| 2006/0118589 A1 | 6/2006 | Arnarp et al. | |
| 2006/0144412 A1 | 7/2006 | Mishra et al. | |
| 2006/0174901 A1 | 8/2006 | Karles et al. | |
| 2006/0191548 A1 | 8/2006 | Strickland et al. | |
| 2006/0204598 A1 | 9/2006 | Thompson | |
| 2006/0228431 A1 | 10/2006 | Eben et al. | |
| 2006/0231113 A1 | 10/2006 | Newbery et al. | |
| 2006/0272662 A1 | 12/2006 | Jupe et al. | |
| 2006/0275344 A1 | 12/2006 | Mody et al. | |
| 2007/0000505 A1 | 1/2007 | Zhuang et al. | |
| 2007/0012328 A1 | 1/2007 | Winterson et al. | |
| 2007/0048431 A1 | 3/2007 | Budwig et al. | |
| 2007/0062549 A1 | 3/2007 | Holton, Jr. et al. | |
| 2007/0077307 A1 | 4/2007 | Rosenberg et al. | |
| 2007/0095356 A1 | 5/2007 | Winterson et al. | |
| 2007/0107747 A1 | 5/2007 | Hill et al. | |
| 2007/0122526 A1 | 5/2007 | Sweeney et al. | |
| 2007/0186941 A1 | 8/2007 | Holton, Jr. et al. | |
| 2007/0186942 A1 | 8/2007 | Strickland et al. | |
| 2007/0186943 A1 | 8/2007 | Strickland et al. | |
| 2007/0186944 A1 | 8/2007 | Strickland et al. | |
| 2007/0190157 A1 | 8/2007 | Sanghvi et al. | |
| 2007/0261707 A1 | 11/2007 | Winterson et al. | |
| 2007/0267033 A1 | 11/2007 | Mishra et al. | |
| 2007/0298061 A1 | 12/2007 | Boghani et al. | |
| 2008/0014303 A1 | 1/2008 | Jacops et al. | |
| 2008/0029110 A1 | 2/2008 | Dube et al. | |
| 2008/0029116 A1 | 2/2008 | Robinson et al. | |
| 2008/0029117 A1 | 2/2008 | Mua et al. | |
| 2008/0081071 A1 | 4/2008 | Sanghvi et al. | |
| 2008/0113031 A1 | 5/2008 | Moodley et al. | |
| 2008/0166395 A1 | 7/2008 | Roush | |

(56) References Cited

U.S. PATENT DOCUMENTS

| | | |
|---|---|---|
| 2008/0173317 A1 | 7/2008 | Robinson et al. |
| 2008/0196730 A1 | 8/2008 | Engstrom et al. |
| 2008/0202536 A1 | 8/2008 | Torrence et al. |
| 2008/0302682 A1 | 12/2008 | Engstrom et al. |
| 2008/0308115 A1 | 12/2008 | Zimmermann |
| 2008/0317911 A1 | 12/2008 | Schleef et al. |
| 2009/0004329 A1 | 1/2009 | Gedevanishvili et al. |
| 2009/0022856 A1 | 1/2009 | Cheng et al. |
| 2009/0022917 A1 | 1/2009 | Gedevanishvili et al. |
| 2009/0025740 A1 | 1/2009 | Chappell, Sr. et al. |
| 2009/0025741 A1 | 1/2009 | Crawford et al. |
| 2009/0035414 A1 | 2/2009 | Cheng et al. |
| 2009/0126746 A1 | 5/2009 | Strickland et al. |
| 2010/0218779 A1 | 9/2010 | Zhuang et al. |
| 2010/0300464 A1 | 12/2010 | Gee et al. |
| 2010/0300465 A1 | 12/2010 | Zimmermann |

FOREIGN PATENT DOCUMENTS

| | | |
|---|---|---|
| EP | 0 145 499 B1 | 4/1989 |
| EP | 0352107 A2 | 1/1990 |
| EP | 0483500 A1 | 5/1992 |
| EP | 0 422 898 B1 | 9/1994 |
| EP | 0 559 425 B1 | 10/1997 |
| EP | 1010639 A1 | 6/2000 |
| EP | 1118274 A | 7/2001 |
| GB | 725764 | 3/1955 |
| GB | 924052 | 4/1963 |
| GB | 1139684 | 1/1969 |
| GB | 1350740 | 4/1974 |
| GB | 2074838 A | 11/1981 |
| JP | 03-240665 A | 10/1991 |
| WO | WO 94/25356 | 11/1994 |
| WO | WO 97/45336 | 12/1997 |
| WO | WO 99/40799 | 8/1999 |
| WO | WO 00/57713 | 10/2000 |
| WO | WO 01/70591 A1 | 9/2001 |
| WO | WO 02/080707 A1 | 10/2002 |
| WO | WO 03/028492 A1 | 4/2003 |
| WO | WO 03/030881 | 4/2003 |
| WO | WO 03/053175 A2 | 7/2003 |
| WO | WO 2004/009445 | 1/2004 |
| WO | WO 2004/052335 | 6/2004 |
| WO | WO 2004/056219 | 7/2004 |
| WO | WO 2004/058217 | 7/2004 |
| WO | WO 2004/064811 A1 | 8/2004 |
| WO | WO 2004/066986 | 8/2004 |
| WO | WO 2004/095959 A1 | 11/2004 |
| WO | 2005/027815 A1 | 3/2005 |
| WO | 2005/046363 A2 | 5/2005 |
| WO | 2005/077232 A2 | 8/2005 |
| WO | WO 2005/084446 | 9/2005 |
| WO | WO 2006/004480 A1 | 1/2006 |
| WO | WO 2006/039487 A | 4/2006 |
| WO | WO 2006/065192 | 6/2006 |
| WO | WO 2006/090290 A | 8/2006 |
| WO | WO 2006/105173 A2 | 10/2006 |
| WO | WO 2006/120570 A2 | 11/2006 |
| WO | WO 2006/127772 A | 11/2006 |
| WO | WO 2007/037962 A1 | 4/2007 |
| WO | WO 2007/057789 A2 | 5/2007 |
| WO | WO 2007/057791 A2 | 5/2007 |
| WO | WO 2007/082599 A1 | 7/2007 |
| WO | WO 2007/104573 | 9/2007 |
| WO | WO 2007/126361 A1 | 11/2007 |
| WO | WO 2008/016520 A2 | 2/2008 |
| WO | WO 2008/042331 A2 | 4/2008 |
| WO | WO 2008/104891 A2 | 9/2008 |
| WO | WO 2008/140372 A1 | 11/2008 |

OTHER PUBLICATIONS

International Search Report and Written Opinion mailed Mar. 24, 2009 for PCT/IB2008/002764.
International Preliminary Report on Patentability issued Jan. 19, 2010 for PCT/IB2008/002764.
International Search Report and Written Opinion mailed Jul. 17, 2009 for PCT/IB2008/002714.
International Preliminary Report on Patentability issued Jan. 19, 2010 for PCT/IB2008/002714.
U.S. Appl. No. 12/789,125 to Mishra et al., filed May 27, 2010.
Partial International Search Report dated Oct. 6, 2006 for PCT/IB2006/001611.
International Search Report and Written Opinion dated Feb. 27, 2007 for PCT/IB2006/002680.
International Preliminary Report on Patentability dated Oct. 30, 2007 for PCT/IB2006/001611.
International Preliminary Report on Patentability mailed Dec. 16, 2008 for PCT/IB2006/002680.
International Search Report and Written Opinion dated Sep. 12, 2008 for PCT/IB2008/001378.
International Search Report and Written Opinion dated Jan. 30, 2009 for PCT/IB2008/002598.
International Search Report and Written Opinion mailed Feb. 25, 2009 for PCT/IB2008/002566.
International Preliminary Report on Patentability issued Dec. 11, 2009 for PCT/IB2008/002598.
International Search Report and Written Opinion mailed Mar. 25, 2009 for PCT/IB2008/002682.
International Preliminary Report on Patentability issued Jan. 19, 2010 for PCT/IB2008/002682.
International Search Report and Written Opinion mailed Mar. 31, 2009 for PCT/IB2008/002681.
International Search Report and Written Opinion mailed Jul. 25, 2006 for PCT/IB2006/001114.
U.S. Appl. No. 12/805,868, filed Aug. 20, 2010.
U.S. Appl. No. 12/748,043, filed Mar. 26, 2010.
U.S. Appl. No. 12/748,205, filed Mar. 26, 2010.
U.S. Appl. No. 12/642,399, filed Dec. 18, 2009.
International Preliminary Report on Patentability dated Aug. 28, 2007 for PCT/IB2006/001114.
International Search Report and Written Opinion mailed Mar. 13, 2009 for PCT/IB2008/002694.
International Preliminary Report on Patentability issued Jan. 19, 2010 for PCT/IB2008/002694.
Satel, Sally M.D., "A Smokeless Alternative to Quitting," Apr. 6, 2004, The New York Times, Accessed Oct. 25, 2010; http://query.nytimes.com/gst/fullpage.html?res=9402EFD91E39F935A35757C0A9629C8B63.

* cited by examiner

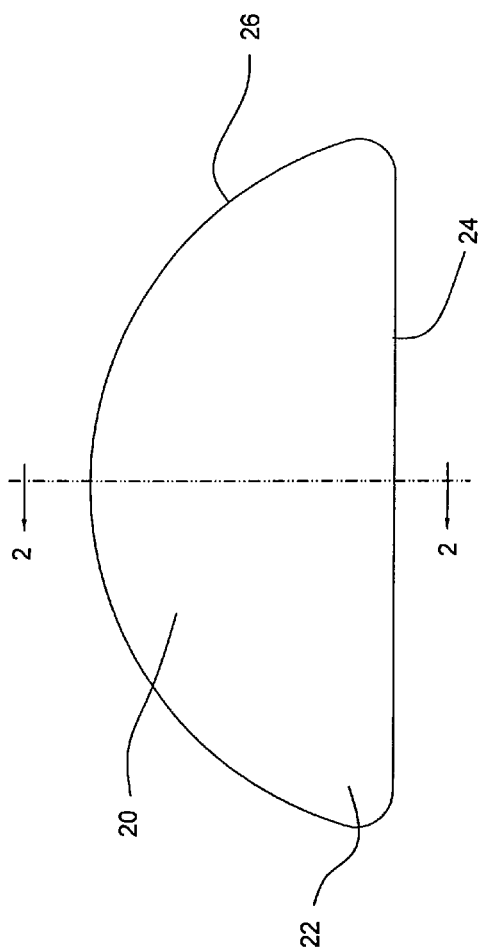
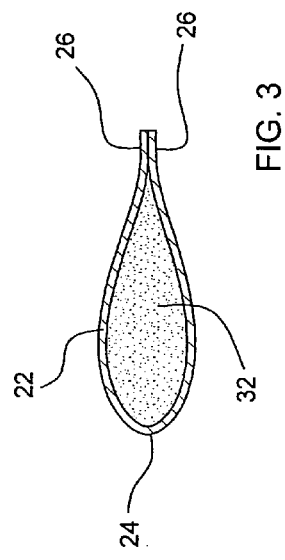
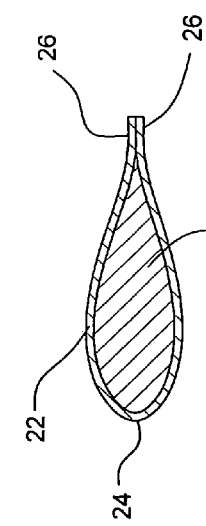
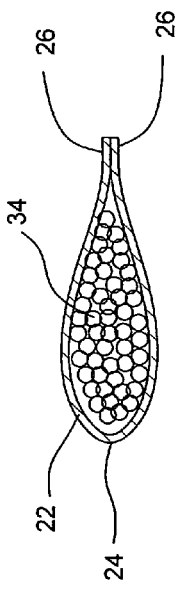

FLAVOR POUCH

RELATED APPLICATIONS

This application claims priority under 35 U.S.C. §119 to U.S. Provisional Application No. 60/738,034 entitled FLAVOR POUCH and filed on Nov. 21, 2005, the entire content of which is hereby incorporated by reference.

FIELD OF THE INVENTION

This disclosure concerns a flavor pouch for oral delivery of one or more selected flavorants.

SUMMARY

Broadly, the flavor pouch of this disclosure comprises an external wrapper that encloses a flavor source. Preferably the pouch is sized to comfortably be received in a human mouth. In addition, the pouch may be sized so that it can be moved around inside a human mouth, while not materially interfering with speech or oral breathing.

The external wrapper preferably comprises a membrane that is sufficiently porous to allow transport through the membrane of flavor from the source. A preferred configuration of the pouch is generally crescent-shaped. Such a crescent shape facilitates manufacture and reduces the amount of peripheral edge sealing that would otherwise be needed. The external wrapper membrane is preferably resistant to deterioration in the presence of saliva and bacteria.

The flavor source may comprise a strip of material having the desired flavor characteristics. Those flavor characteristics may be natural, synthetic, artificial or combinations thereof. Moreover, those flavor characteristics may be (i) applied to the surface of the strip, (ii) integral with the material of the strip, or (iii) additives in the body of the strip material.

Other flavor sources may be beads, with or without soluble encapsulation. Encapsulation may provide a time-release function so that the flavorant is dispensed over a longer time period than would otherwise occur. Alternatively, the flavor source may also be a solid or a highly viscous fluid. Furthermore, the flavor source may be a matrix, either natural or synthetic, capable of holding flavorant materials or compounds.

Preferred flavorants for use in the pouch include, without limitation, both natural and artificial flavor compounds. Preferred flavors are preferably adult flavors that are neither sweet nor sour. Preferred adult flavors for use are, again without limitation, tea, rose hips, honey, royal jelly, fruit extracts, vitamins, coffee, mint, spices such as ginger, pepper extract, exotic fruits, exotic vegetables, international, and ethnic flavors.

BRIEF DESCRIPTION OF THE DRAWINGS

FIG. 1 is a top view of a flavor pouch.

FIG. 2 is cross-sectional view of the flavor pouch taken along the line 2-2 of FIG. 1.

FIG. 3 is a cross-sectional view of a second embodiment of the flavor pouch of FIG. 1 with a different flavor source.

FIG. 4 is a cross-sectional view of a third embodiment of the flavor pouch of FIG. 1 with still another flavor source.

DETAILED DESCRIPTION

Figure 8:
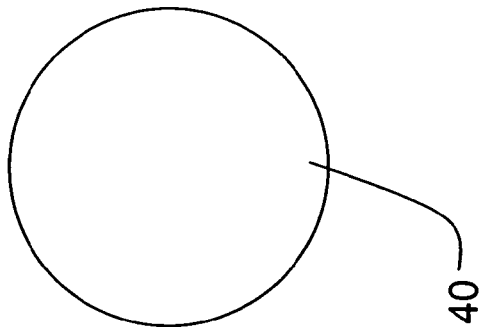
FIG. 8 is a plan view showing the location of a thermal weld.

Turning now to FIG. 1, a flavor pouch 20 is depicted according to one embodiment of this disclosure. Overall dimensions of the pouch 20 are selected so that it can be comfortably received in a human oral cavity. Typically, the pouch 20 is sized so as to comfortably fit between the consumer's cheek and gum in the jaw area. By way of example, and without limitation, the major dimension of the pouch 20 may be in the range of about 0.6 to about 1.2 inches while the transverse dimension of the pouch may be in the range of about 0.35 to about 0.75 inches. With such dimensions, the pouch 20 can be comfortably positioned in the oral cavity or on the tongue. Where the pouch 20 is designed to be retained between the cheek and the gums of the oral cavity, the proportions of the pouch may be smaller. With dimensions in the ranges set out above, the pouch 20 can be retained in the oral cavity without any substantial interference with speech or breathing. Such a pouch 20 can also be maneuvered or manipulated by the tongue to move the pouch around in the oral cavity.

In the illustrated embodiment, the pouch 20 is shaped generally like a segment of a circle with rounded or filleted corners. Preferably, the pouch 20 is substantially free of oral cavity irritant, which, as used herein, means that the shape, configuration, and position of the pouch 20 do not irritate oral tissues (e.g., gums). Furthermore, "substantial" and "substantially free" as used in connection with oral cavity irritant mean that the shape, configuration, and position of the pouch 20 does not irritate oral tissues (e.g, gums) in a time frame having the same order of magnitude as a typical length of time during which the pouch 20 is enjoyed by a user. Generally, sharp corners are preferably avoided as sharp corners may lead to oral discomfort. In addition to sharp corners, sealed edge potions (seams) along the consumer's gum base may lead to oral discomfort. Accordingly, when inserted into the mouth and aligned to the consumer's gum base, the presently disclosed pouch 20 that is substantially free of oral cavity irritant does not have any sealed edge potion or sharp corner along the consumer's gum base. While the illustrated embodiment of the pouch 20 is generally a circular segment, many other configurations are within the contemplation of this disclosure. For example, other shapes may also be selected for the pouch 20 including, for example, elliptical, oblong, polygonal with rounded corners or without rounded corners when the number of sides is sufficiently large that the non-rounded corners do not create a substantial irritant.

The pouch 20 preferably includes a cover material 22 that is suitable for oral use and which is not soluble in saliva. More particularly, it is preferred that the cover material 22 of the pouch 20 maintain sufficient structural integrity during the time period that the pouch 20 is used that the cover material 22 will retain flavorant carrier material contained therein. The cover material 22 may be fabricated from natural material, synthetic material, or a combination of natural and synthetic materials. Preferably, the cover material 22 is selected so as to be tasteless and may comprise a woven or non-woven web. Nevertheless, it is further contemplated that the cover material 22 may interact with the flavorant and/or its carrier in the presence of saliva to generate a more complex flavor.

Where the pouch 20 has a crescent shape, the cover material 22 may be folded on itself so that it has an integral edge portion 24 and overlapping edge portions 26. The overlapping edge portions 26 are sealed together. Preferably, that sealing function is accomplished by an adhesive or by mutual sealing the overlapping edge portions 26. Such mutual sealing may be thermal or sonic. Where the pouch 20 has a different external contour, the cover material 22 for the pouch 20 may be in two overlapping pieces. If desired, the crescent-shaped pouch 20 may also be fabricated from two overlapping pieces. Where overlapping pieces are used, the peripheral edge portions of the pieces are preferably sealed together, as described above.

While pouches have traditionally used cellulose fiber as the cover material, e.g., tea bags, alternative pouch materials may also be advantageously used as the covering material disclosed herein. Alternative cover materials with a neutral or pleasant taste or odor preferably have the properties of stain resistance, color, water permeability and/or porosity, and/or water insolubility.

Additionally, the cover materials used for the pouch materials can be provided with predetermined levels for basis weight and/or wet strength to minimize breakage of the pouch cover material during storage and use. For example, pouch cover materials may have a basis weight of about 5 to about 25 grams/square meter (g/m$^2$), such as 5-10, 10-15, 15-20, or 20-25 g/m$^2$, and/or a wet tensile cross-direction (CD) strength of about 15 to about 75 N/m (Newtons/meter), such as 15-30, 30-45, 45-60, or 60-75 N/m. The basis weight and/or tensile strength are preferably sufficient for maintaining integrity of the pouch 20 so that any internal material will be retained therein. One exemplary pouch cover material has a basis weight of about 16.5 g/m$^2$ and a wet tensile CD strength of 68 N/m.

In an exemplary embodiment, a water-permeable, water-insoluble, porous, stain-resistant polymer membrane can be used as the pouch cover material to allow flavor from a barrier material to permeate through the pouch cover material thereby minimizing absorption or trapping of the flavor within the pouch cover material. If desired, a pouch cover material 22 may include a coating of a barrier material to minimize staining of the pouch material by its contents. Preferred characteristics of the covering material 22 include controlled permeability and high mouth comfort. These characteristics are available from non-woven polypropylene fabric which is preferred for material 22.

Regardless of the external contour of the pouch 20, the integral and/or overlapping edge portions define an internal cavity enclosed by the cover material 22 sized to receive a carrier for the flavorant. In one embodiment (see FIG. 2), the carrier 30 may be a substantially solid material such as a dissolvable film that is contained within the cover material 22. The flavorant itself may be a surface treatment of the carrier 30, a mixture with the material of the carrier, or a combination of such a mixture and a surface treatment. For such an embodiment, the flavorant itself may be selected from the group consisting of tea, rose hips, honey, royal jelly, fruit extracts, vitamins, coffee, fruits, mint, vegetables, sweeteners, international flavors, ginger, pepper extract, exotic flavors, and ethnic flavors. Other flavors are also within the contemplation of this disclosure, whether natural, synthetic, or a combination of natural and synthetic. Moreover, flavors can be combined as may be desired, e.g., coffee-mint, pomegranate-kiwi. The flavor or combination of flavors is selected to enhance consumer sensorial enjoyment of the product.

The carrier 30 may completely fill the chamber defined by the cover material 22. Alternatively, there may be substantial empty volume in the pouch 20 and around the carrier 30.

Preferred materials for the carrier 30 include polymeric matrices, or materials with very high viscosity (i.e., having a carmel-like or taffy-like consistency). If desired, the carrier 30 may comprise one or more pieces of dried fruit. Generally, however, the flavorant is infused within or inherently part of the carrier to provide a long-lasting flavor experience. The carrier 30 may also be soluble so that it dissolves in saliva over time and passes through the porous covering material 22 into the oral cavity along with the flavorant.

Another embodiment of the carrier 32 (see FIG. 3) comprises a granular or powder material. Again, the granular or powder material may comprise a polymeric matrix, or substantially solid material where the flavorant is (i) a surface coating, (ii) incorporated in the material particles, or (iii) mixed with the carrier material particles.

Another embodiment of the carrier 34 (see FIG. 4) comprises a plurality of beads. Each bead 34 may be generally spherical or irregularly shaped. Moreover, each bead 34 may be fabricated (i) from the flavorant material, (ii) from a matrix incorporating the flavorant, (iii) with the flavorant as a surface coating, or (iv) a combination of two or more of those features. To increase the time duration of flavor release, one or more of the beads 34 may be encapsulated is a soluble coating which impedes flavor release from some of the beads 34 while other beads are active in flavor release. Thus, encapsulation of all or some of the beads 34 promotes flavor release over a substantially extended time period.

As with the carrier 30 of the first embodiment, the flavorant used with the carriers 32, 34 of this embodiment may be selected from the group consisting of tea, rose hips, honey, royal jelly, fruit extracts, vitamins, coffee, fruits, mint, vegetables, ginger, pepper extract, sweeteners, exotic flavors, and ethnic flavors. Other flavors are also within the contemplation of this disclosure, whether natural, synthetic, or a combination of natural and synthetic. Moreover, flavors can be combined as may be desired, e.g., coffee-mint, pomegranate-kiwi. The flavor or combination of flavors is selected to enhance consumer sensorial enjoyment of the product.

It should also be noted that this disclosure contemplates use of the pouch to provide functional benefits in the health and beauty, medicinal, and cosmetic fields. For example, the pouch might be used for oral delivery of medication. In such an application, the medication may be in addition to a flavorant or may comprise the flavorant. Furthermore, this disclosure contemplates that the pouch 20 may include two or more flavorants so that compound flavors may be generated.

From the foregoing, it will be observed that a method of flavor delivery to an oral cavity results from the fabrication and use of the pouch 20 according to this disclosure. As an initial step, a desired flavorant is combined with a carrier. That combination step may include the mixing of two or more flavor compounds together to obtain the desired taste. The flavor compounds may be naturally occurring, or synthetic, or a combination of both. Where a solid carrier is used, that carrier 30 (see FIG. 2) may be coated with the flavorant, or fabricated with the flavorant as an internal component. Where a particulate carrier is used, that carrier 32 may also be mixed with a particulate flavorant. Or, the flavorant can be incorporated into the carrier material followed by comminution to the desired particulate size. Combinations of mixture and incorporation are also acceptable. For beads (see FIG. 4) the beads 34 may be fabricated entirely from the flavorant, or may be fabricated as a mixture of a carrier and the flavorant. To enhance the duration of flavor release, some or all of the beads 34 or particles 32 may be encapsulated. The encapsulation compound is preferably soluble in saliva so that as the encapsulation coating dissolves, additional flavorant is released.

Figure 5:
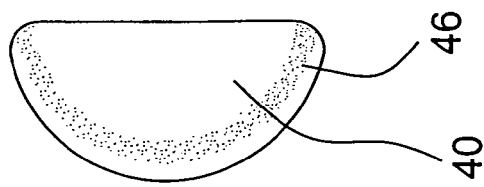
FIG. 5 is a plan view of a blank for making the flavor pouch.

With the flavorant having been combined with a carrier, the carrier is placed or deposited on a blank 40 (see FIG. 5) which may be circular as shown. The blank 40 is a piece of porous covering material 22 described more particularly above. Preferably, the material of the blank 40 is substantially tasteless and may comprise a membrane.

Figure 6:
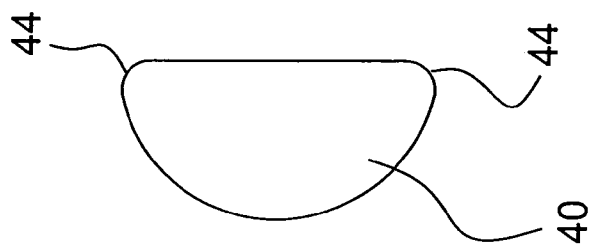
FIG. 6 is a plan view of the blank with a filling in place.

Next (see FIG. 6), the flavorant and carrier material 42 are deposited on the blank 40 such that the flavorant and carrier material 42 are spaced inwardly away from the perimeter of the blank 40.

Figure 7:
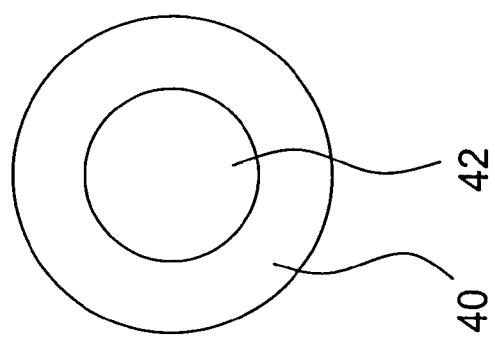
FIG. 7 is a plan view of the folded blank.

Depending on the desired external contour of the finished piece, a second blank may be placed on top of the first blank 40 and the carrier material 42. In the presently preferred arrangement, one part of the first blank 40 is folded over the carrier material and the other part of the blank 40 so as to define a substantially crescent-shaped article (see FIG. 7). Peripheral edge portions of the blank 40 are then sealed to one another (see FIG. 8). Sealing may be accomplished by applying an edible adhesive, or by bonding peripheral portions of the blank 40 together. Such bonding may be a form of mutual sealing 46, e.g., thermal or sonic, if desired. Preferably, the overlapping parts of the blank 40 are trimmed along the folded edge so as to provide rounded corners 44, thereby effectively eliminating any sharp corners.

With the carrier thus enclosed in the covering material, the assembly is ready for distribution and, ultimately, use. In use, the assembly is placed in the consumer's mouth or oral cavity. If placed on the tongue, saliva contacts the carrier and flavorant through the covering material 22 thus releasing the flavor into the oral cavity. The flavorants typically stimulate production of additional saliva in the mouth so that continuing saliva contact and flavorant release occurs.

Flavorant release may also result from mastication of the carrier between the consumer's teeth. In such a situation, the flavorant release is accomplished by occasional chewing of the pouch. Extended-time flavor release is then accomplished by occasional chewing to release additional flavor.

Where the flavorant is in bead form, the flavorant may comprise a liquid contained in one or more rupturable beads. In use, mastication of the pouch 20 will release flavorant on demand. Alternatively, continued exposure to saliva may dissolve the beads thereby exposing the flavorant. Furthermore, encapsulated beads provide randomly delayed release of flavorant from corresponding beads so that flavor release occurs over a relatively extended duration of time.

The pouch 20 of this disclosure has a distinctive, neat, and attractive appearance. Moreover, the pouch 20 is sized so as to be self-aligning to the gum base when inserted into the mouth. Furthermore, the absence of orally irritating corners and edges improves the mouth comfort or feel of the resulting pouch 20.

Where the term "about" is used in this specification as a modifier for a specific number, that term is intended to include not only the specific number but also a tolerance for that number of +/−10%.

The pouch of a flavorant and carrier in a tasteless, porous covering provides a new delivery system for flavorants to adults. It will also be apparent to those skilled in the art that numerous modifications, variations, substitutions, and equivalents exist for features of the invention that do not materially depart from the spirit and scope of the invention. Accordingly, it is expressly intended that all such modifications, variations, substitutions, and equivalents which fall within the spirit and scope of the appended claims be embraced thereby.

What is claimed is:

1. A flavor pouch for oral delivery of one or more flavorants to the human oral cavity, consisting of:
    a porous membrane to be received in the human oral cavity; and
    a first flavorant provided in a liquid and contained in a plurality of rupturable beads which are enclosed by said porous membrane, and a second flavorant contained in a plurality of dissolvable beads which are also enclosed by said porous membrane, wherein said first flavorant and said second flavorant are operable to release a flavor through said porous membrane into the human oral cavity;
    wherein said dissolvable beads containing said porous membrane was initially provided in sheet form, was folded to completely enclose said rupturable beads containing said first flavorant and said second flavorant at a central region, and the overlapping outer regions of said porous membrane were heat sealed in an arcuate configuration; and
    wherein said first flavorant is capable of immediate release into the oral cavity on demand if desired by the mastication with rupture of said one or more rupturable beads, and said second flavorant is capable of release through dissolution with the exposure of flavorant contained therein over an extended duration of time upon contact with saliva.

2. The flavor pouch of claim 1, wherein the porous membrane comprises a web.

3. The flavor pouch of claim 1, wherein the first and/or second flavorant comprises an artificial sweetener.

4. The flavor pouch of claim 1, wherein the first and/or second flavorant includes a flavor selected from the group consisting of tea, rose hips, honey, royal jelly, fruit extract, coffee, ginger, pepper extract, and mint.

5. The flavor pouch of claim 1, wherein the major dimension of each flavor pouch is about 0.6 to 1.2 inches.

6. The flavor pouch of claim 1, wherein said flavor pouch has corners, all said corners being rounded.

7. The flavor pouch of claim 1, wherein said flavor pouch has rounded corners.

8. The flavor pouch of claim 1, wherein the porous membrane is not soluble in saliva and has structural integrity sufficient to remain intact while the flavor pouch is present in a human oral cavity.

9. The flavor pouch of claim 1, wherein the porous membrane includes combination of natural and synthetic material.

10. The flavor pouch of claim 1, wherein the porous membrane is a non-woven web.

11. The flavor pouch of claim 1, wherein the porous membrane is sealed only along said arcuate heat seal.

12. The flavor pouch of claim 1, wherein the porous membrane has a basis weight of 5 to 25 g/m$^2$.

13. The flavor pouch of claim 1, wherein the porous membrane is a water-permeable, water-insoluble stain resistant polymer membrane.

14. The flavor pouch of claim 1, wherein the porous membrane includes a coating of a barrier material which minimizes staining of the flavor pouch exterior by its contents.

15. The flavor pouch of claim 1, wherein said porous membrane is non-woven polypropylene fabric.

16. A flavor pouch for oral delivery of one or more flavorants to the human oral cavity, consisting of:
   a porous membrane of non-woven polypropylene fabric having rounded corners to be received in the human oral cavity; and
   a first flavorant provided in a liquid and contained in a plurality of rupturable beads which are enclosed by the porous membrane of non-woven polypropylene fabric and a second flavorant contained in a plurality of dissolvable beads which are also enclosed by said porous membrane of non-woven polypropylene fabric wherein said first flavorant and second flavorant are operable to release a flavor through said porous membrane into the human oral cavity,
   wherein said porous membrane is not soluble in saliva and has structural integrity sufficient to remain intact while the flavor pouch is used in a human oral cavity,
   wherein said porous membrane was initially provided in sheet form, was folded to completely enclose said flavorant beads of said first and second flavorants at a central region, and the overlapping outer regions of said porous membrane were heat sealed only in an arcuate configuration, and
   wherein said first flavorant is capable of immediate release into the oral cavity on demand if desired by the mastication with rupture of said one or more rupturable beads, and said second flavorant is capable of release through dissolution and exposure of flavorant over an extended period of time upon contact with saliva.

17. The flavor pouch of claim 16, wherein the said porous membrane includes a coating of a barrier material which minimizes staining of the flavor pouch exterior by its contents.

18. The flavor pouch of claim 16, wherein said porous membrane is heat sealed with rounded corners, whereby mouth irritation to users is abated and manufacture of the pouch is facilitated.

* * * * *